United States Patent
Hill et al.

[11] 3,875,569
[45] Apr. 1, 1975

[54] TARGET DETECTION SYSTEM IN A RADAR SYSTEM EMPLOYING MAIN AND GUARD CHANNEL ANTENNAS

[75] Inventors: Richard M. Hill, Camarillo; David A. Kramer, Canoga Park; Roy H. Makino, Woodland Hills, all of Calif.

[73] Assignee: Hughes Aircraft Company, Culver City, Calif.

[22] Filed: May 8, 1974

[21] Appl. No.: 467,966

Related U.S. Application Data

[63] Continuation of Ser. No. 370,587, June 15, 1973, abandoned.

[52] U.S. Cl. ......... 343/5 R, 343/5 PD, 343/100 LE
[51] Int. Cl. .............................................. G01s 9/02
[58] Field of Search ........... 343/100 LE, 5 R, 5 PD, 343/5 CM

[56] References Cited
UNITED STATES PATENTS

| | | | |
|---|---|---|---|
| 2,825,900 | 3/1958 | Coelbohm | 343/100 LE |
| 2,938,206 | 5/1960 | Davis et al. | 343/100 LE |
| 3,094,695 | 6/1963 | Jahn | 343/100 LE |
| 3,177,489 | 4/1965 | Saltzberg | 343/100 LE |

*Primary Examiner*—Maynard R. Wilbur
*Assistant Examiner*—G. E. Montone
*Attorney, Agent, or Firm*—W. H. MacAllister; Walter J. Adam

[57] ABSTRACT

In an airborne radar system of the type including a main high gain narrow beamwidth antenna and a guard low gain wide beamwidth antenna with main and guard receiver channels, a detection system based on separately thresholding the outputs of both channels and their ratio. Mainlobe target detection is assumed to occur only when either the output of the main channel exceeds a main threshold level and the output of the guard channel does not exceed a guard threshold level or when the outputs of the two channels exceed their respective thresholds and the ratio (or the difference) of the outputs from the two channels exceed a ratio threshold level. The main and guard threshold levels are generated as a function of the background noise levels in the two channels.

16 Claims, 11 Drawing Figures

3,875,569
Fig. 3a.
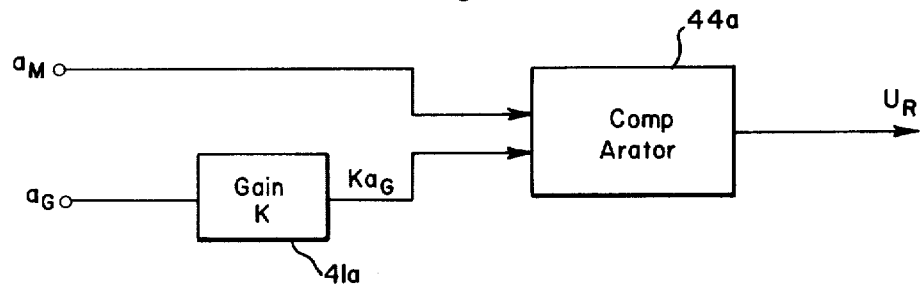
Fig. 3b.
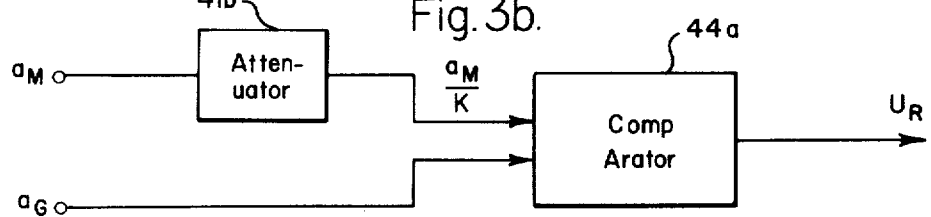
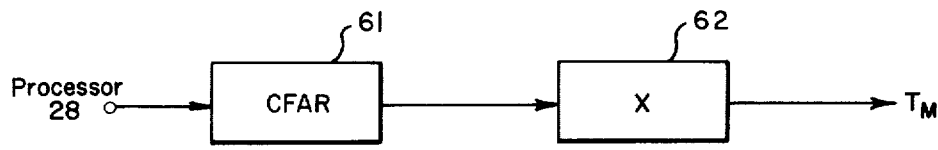
Fig. 6.
Fig. 7.
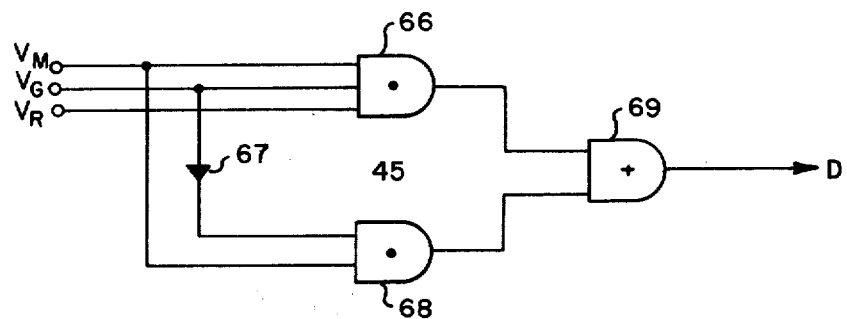

TARGET DETECTION SYSTEM IN A RADAR SYSTEM EMPLOYING MAIN AND GUARD CHANNEL ANTENNAS

The invention herein described was made in the course of or under a contract or subcontract thereunder with the Air Force.

This is a continuation of application Ser. No. 370,587, filed June 15, 1973, now abandoned.

BACKGROUND OF THE INVENTION

1. Field of the Invention

The present invention generally relates to a radar system and, more particularly, to improvements in a radar system employing main and guard channels.

2. Background of the Invention

The problem of detecting airborne targets in the presence of highly reflective ground targets is well known. Quite often airborne radar systems must operate in environments where in addition to radar returns from airborne targets to be detected, numerous returns are also received from highly reflective ground objects, through the main antenna sidelobes. Sources of such returns include terrain irregularities and man-made structures or vehicles. The returns through the main antenna sidelobes, frequently produce false airborne target detections, i.e., produce detections which cannot be distinguished from airborne targets. This, effective operation of airborne radar systems requires a method of discriminating between the desirable airborne targets whose returns are received through the antenna's mainlobe and the undesirable ground returns which are received through the main antenna sidelobes.

Herebefore some airborne radar systems have employed radar receivers which incorporate a guard channel in addition to the main channel, in order to obtain at least partial discrimination between the airborne and ground targets. In some systems, the difference between the outputs of the two channels is obtained, and if it exceeds a selected threshold, an airborne target is indicated only if the main channel output exceeds a given threshold. The disadvantages of such systems are that sidelobe detection probability increases with increased signal-to-noise ratio (SNR) and that only high SNR targets are detectable.

In other systems, the outputs of the two channels are thresholded separately and no detection is assumed to occur if the output of the guard channel is higher than its threshold, even though the output of the main channel exceeds its threshold. The disadvantage of such arrangements is that the probability of detection of an airborne target in the mainlobe increases to a peak value as the signal to noise ratio (SNR) increases to a given value and thereafter drops as SNR increases above that value.

In another approach, which has been proposed, the ratio of the main to guard channel outputs is obtained. If it exceeds a given threshold, a target detection is assumed to occur only if the main channel output exceeds a selected threshold. Such a scheme is proposed in an article entitled, "Performance of Sidelobe Blanking Systems," published on page 174 of the March 1968 issue of IEEE Transactions on Aerospace and Electronic Systems.

In this scheme, the guard channel output is not thresholded and is used only to provide the main to guard channel output ratio. Only the main channel output is thresholded when the ratio exceeds a given threshold. An analysis of this scheme indicates that even though it improves the probability of detection in the antenna mainlobe with increased SNR, it also increases the probability of detection through the sidelobes, thus resulting in higher than desirable false detections of airborne targets.

OBJECTS AND SUMMARY OF THE INVENTION

It is an object of the present invention to provide a radar system with improved probability of detection of airborne targets in the presence of ground targets.

Another object of the present invention is to provide improvements in a radar system receiver of the type including main and guard channels to increase the probability of target detection.

A further object of the present invention is to provide new means responsive to the outputs of the main and guard channels of a radar system receiver.

These and other objects of the invention are achieved by providing in a radar system receiver of the type including main and guard channels, detection and ground target discrimination logic circuitry which perform the following functions. The main channel output $a_M$ is compared with a main channel threshold level $T_M$. Detection in the main channel is assumed to occur only if the output $a_M$ exceeds the main channel threshold level $T_M$. Similarly, detection in the guard channel is assumed to occur only when the guard channel output $a_G$ exceeds a selected guard channel threshold level $T_G$. The ratio of outputs of the two chanels defined as $R$, where $R = a_M/a_G$, is obtained and compared with a threshold level K. In the present invention, a target is assumed to be detected only if detection occurs in the main channel and is absent in the guard channel, or when detection is present in both channels and the ratio R is greater than the threshold level K.

The novel features of the invention are set forth with particularity in the appended claims. The invention will best be understood from the following description when read in conjunction with the accompanying drawings.

BRIEF DESCRIPTION OF THE DRAWINGS

FIGS. 3a and 3b are partial block diagrams of circuit arrangements which perform functions analogous to those performed by circuits shown in FIG. 3.

FIGS. 6 and 7 are partial block diagrams of the present invention.

DESCRIPTION OF THE PREFERRED EMBODIMENTS

Figure 1:
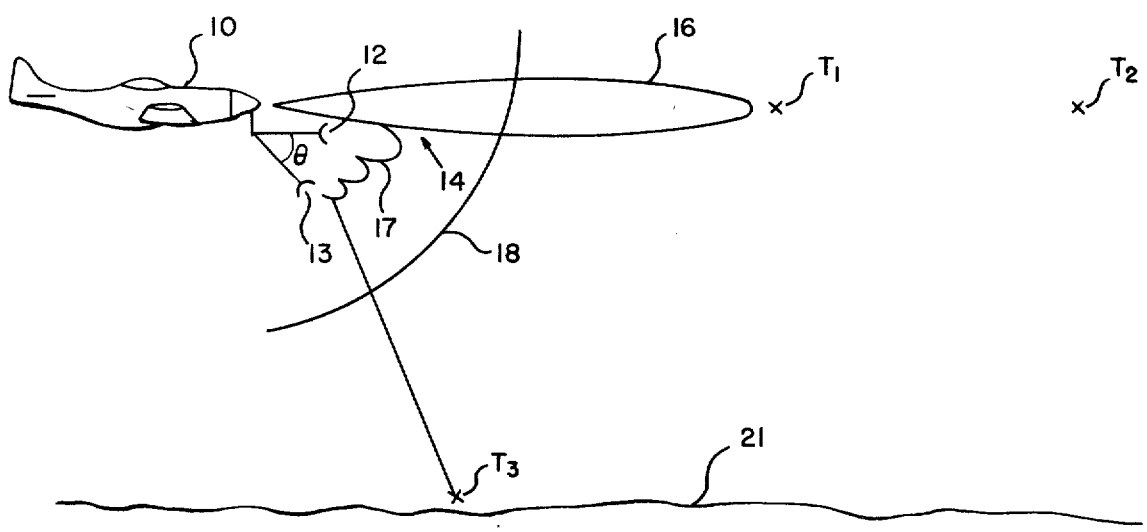
FIG. 1 is a diagram useful in explaining the environment in which the present invention is employed.

Attention is directed to FIG. 1 wherein numeral 10 designates an aircraft carrying an airborne radar system which includes a main antenna 12 and a guard antenna 13. Main antenna 12, which is operated both as a transmit and receive antenna, is a high gain narrow beamwidth antenna whose pattern is represented by line 14, with a mainlobe 16 and sidelobes 17. Guard antenna 13, on the other hand, operates only in the receive mode and has a low gain wide beamwidth pattern as represented by line 18. As shown in FIG. 1, the antennas are mounted so that their axes are offset by an angle $\theta$. Consequently, when the axis of main antenna is in the horizontal direction 20, the axis of guard antenna 13 points toward ground 21 at the angle $\theta$ and leads the main antenna axis by this angle as the antennas are scanned in elevation, (towards the ground).

Figure 2:
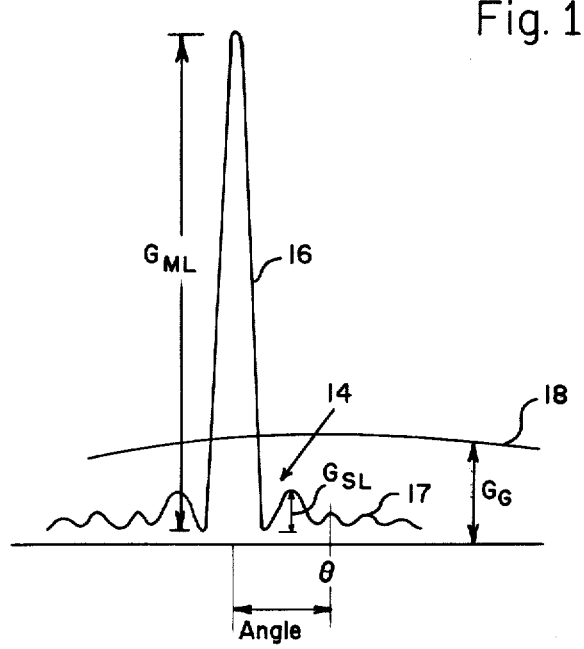
FIG. 2 is a pattern diagram of the antennas shown in FIG. 1.

The function of the radar system, in which the present invention is incorporated, is to increase the probability of detecting airborne targets, hereafter referred to as mainlobe (ML) targets, such as T1 and T2, present over a large range from the aircraft 10, while at the same time inhibiting ground target, such as T3, whose radar returns are received by the guard antenna 13, as well as through the sidelobes of the main antenna 12, and which are hereafter referred to as sidelobe (SL) targets, from being regarded as airborne targets. The idealized patterns of the two antennas are also diagrammed in FIG. 2. As is appreciated, the guard channel antenna, since it is of wide beamwidth, its pattern is effectively a single lobe, and for the following discussion, its gain designated $G_G$, can be regarded as substantially constant. On the other hand, the main antenna gain is angle dependent. In FIG. 2, the gain in the mainlobe is designated $G_{ML}$, while that in the primary sidelobes $G_{SL}$. The antennas are selected so that $G_{ML}/G_G$ is guite large, e.g., 30, and $G_{SL}/G_G$ is always less than one, e.g., ½.

Figure 3:
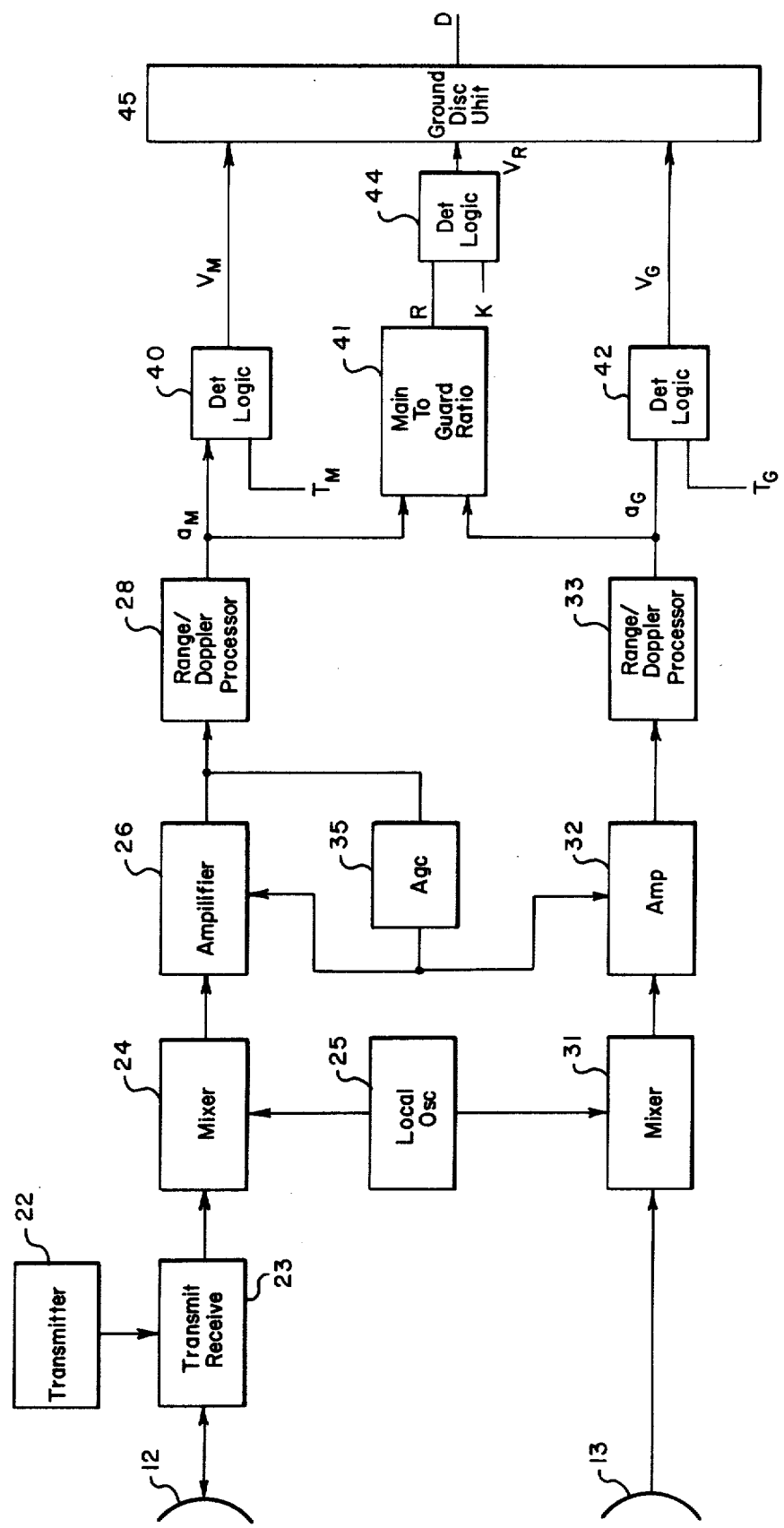
FIG. 3 is a general block diagram of the present invention.

Attention is now directed to FIG. 3 which is a block diagram of a radar system in accordance with the present invention. The radar signals to be transmitted by main antenna 12 are supplied to it from a transmitter 22 through a transmit-receiver (TR) unit 23, while the radar returns from the antenna are supplied to a mixer 24 through TR unit 23. The output of a local oscillator 25 is mixed with the radar returns in mixer 24 whose output after amplification by amplifier 26 is supplied to a range/doppler processor 28. Mixer 24, amplifier 26, and processor 28, all of which consist of circuitry well known in the art, represent the receiver main channel. The output of processor 28 for each range-doppler cell of interest, which is designated by $a_M$, represents the main channel output.

In FIG. 3, numeral 31 designates a mixer which mixes the received radar returns from guard antenna 13 with the output of oscillator 25. An amplifier 32 amplifies the output mixer 31 and a range/doppler processor 33 processes the amplified output of amplifier 32 and provides outputs $a_G$ for range-doppler cells corresponding to those processed in processor 28 of the main channel. Antenna 13, mixer 31, amplifier 32, and processor 33, represent the guard channel. As shown in FIG. 3, the receiver also includes an automatic gain control (AGC) unit 35, which is used to control the amplification in the two amplifiers 26 and 32, in proportion to the signal amplitude in the main channel. This is desirable in order not to introduce any differential amplification effect on the corresponding outputs $a_M$ and $a_G$, whose ratio or difference is used in the detection criteria. AGC is required to prevent signal saturation detection criteria. AGC is required to prevent signal saturation which would alter the relative amplitudes of the outputs of the two channels. If AGC were used independently in each channel, it would introduce differential gain effects.

The portion of the system described thus far is substantially similar to prior systems using a guard channel for the suppression of undesirable ground target detections. The primary novelty of the invention resides in the manner in which the main and guard channel outputs are utilized to suppress the ground target detection without appreciably suppressing real airborne targets. In accordance with the present invention, the main channel output $a_M$, is supplied to a detection logic unit 40, such as a comparator, and to a main-to-guard ratio unit 31, such as divider. Similarly, the guard channel output $a_G$ is supplied to a detection logic unit 42, e.g., a comparator, as well as to ratio unit 41. Logic unit 40 provides an output designated $V_M$, which is true only when $a_M$ exceeds a main threshold level, or simply main threshold $T_M$. Otherwise, $V_M$ is false. A true $V_M$ output represents detection in the main channel. Similarly, unit 52 provides a true output $V_G$ indicating detection in the guard channel only when $a_G$ exceeds a guard threshold $T_G$. Ratio unit 41 divides $a_M$ by $a_G$ to provide an output designated R. This output is compared in a comparator 44 with a ratio threshold K. The output of comparator 44 designated $V_R$ is true only if $R > K$. Otherwise, $V_R$ is false.

In practice, the function performed by ratio unit 41 and comparator 44 may be performed by either of the circuit arrangements shown in FIGS. 3a and 3b. As shown in FIG. 3a, the main channel output $a_M$ may be supplied directly to a comparator 44a and the guard channel output $a_G$ may first be amplified by amplifier 41a with an amplification factor K. The output of the amplifier 41a, $Ka_G$ is also supplied to comparator 44a whose output $V_R$ is true only if $a_M > Ka_G$ which is the equivalent of $a_M/a_G > K$. In FIG. 3a the guard channel output $a_G$ is shown supplied directly to comparator 44a and the main channel output $a_M$ is shown attenuated by a factor K in an attenuator 41b whose output is $a_M/K$. Thus, the output of comparator 44a, i.e., $V_R$, is true only if $a_M/K > a_G$ which is also equivalent to $a_M/a_G > K$. For explanatory purposes, however, the invention will be described in conjunction with the arrangement shown in FIG. 3 in which the main-to-guard channel output ratio is derived and $V_R$ is true only when this ratio defined as R exceeds K. The arrangements shown in FIGS. 3a and 3b should be deemed as equivalents thereof.

In accordance with the present invention, the outputs $V_M$, $V_R$ and $V_G$ are supplied to a ground target discrimination unit 45 which provides an output D. This unit is true, indicating the detection of a mainlobe target at the range-doppler cell of interest only when $V_M$ is true and $V_G$ is false, or when $V_M$, $V_G$ and $V_R$ are all true.

The logic performed by unit 45 is expressable as $$D = \overline{V}_M V_G + V_M V_G V_R.$$

That is, a mainlobe target is assumed to be detected only when detection is present in the main channel and absent in the guard channel, or when detection is present in both channels and $V_R$ is true. Such an arrangement has been found to be very advantageous in discriminating between undesirable ground targets and airborne targets of interest.

Figure 4:
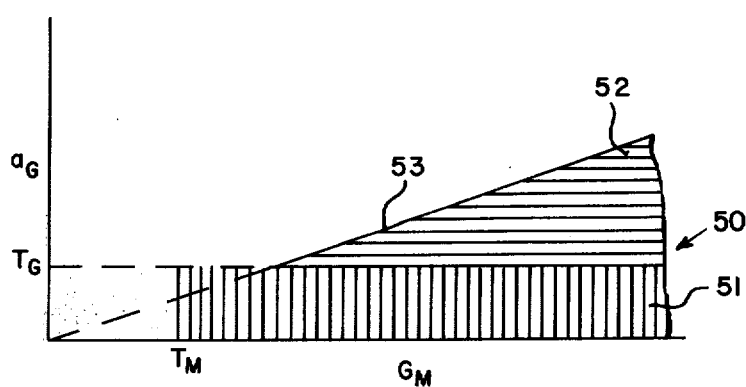
FIGS. 4, 5a, 5b, and 5c are diagrams useful in explaining the present invention and its advantages.

The conditions under which D is true are diagrammed in FIG. 4, which is a diagram of $a_M$ vs $a_G$. Therein, the area 50, which includes the vertically lined area 51 and the horizontally lined area 52, represents the conditions when D is true. As shown, $T_G$ is less than $T_M$. That is, the guard channel threshold is set to be more sensitive than the threshold in the main channel. Area 51 represents the condition of detection when detection takes place in the main channel and not in the guard channel, while area 52 represents the condition when detection occurs in both channels and $a_M/a_G = R$ is greater than K (or its equivalents as shown in FIGS. 3a and 3b). In FIG. 4, line 53 represents a chosen ratio of $a_M/a_G$ which is equal to K.

It has been discovered that by proper selection of $T_M$ and $T_G$ as a function of the average noise levels in the two channels, and by the proper selection of K, nearly all SL targets can be suppressed while detecting a very high percentage, e.g., 90% of all ML targets. Thus, in the present invention, whenever D is true, it indicates to a high degree of probability, a true airborne target rather than a false airborne target due to ground target returns. For high SNR cases, nearly 100% of all airborne targets are detected. That is, normal probabilities law govern airborne target detection, the same as without the guard channel.

Figure 5B:
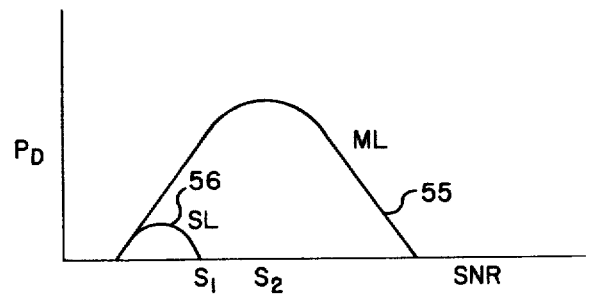
Figure 5C:
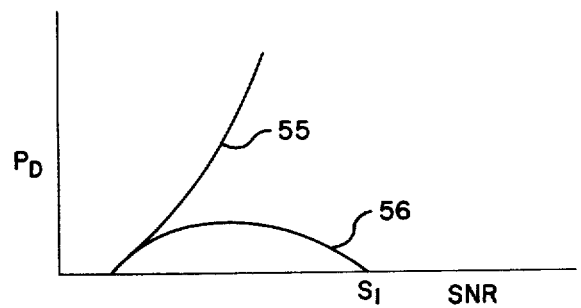
Figure 5A:
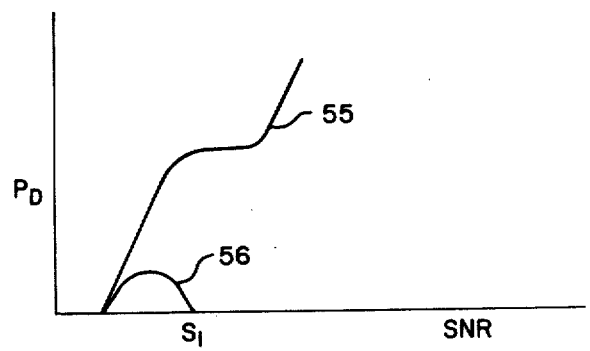

It should be pointed out that the present invention differs from the prior art system in which the outputs of both channels are separately thresholded, and airborne target detection is assumed to occur only if detection occurs in the main channel and not in the guard channel. In the present invention, airborne target detection may occur even though detection in both channels takes place, if in addition, the ratio of $a_M/a_G = R$ is greater than K. The advantage of the present invention over such a prior art system is in the ability of the present system to detect strong ML targets, i.e., airborne targets, which are suppressed in the prior art system. FIGS. 5a and 5b, respectively represent the probability of detection $P_D$ of targets as a function of target strength, i.e., signal to noise ration, (SNR), in the present system, and in the prior art system in which both channels are thresholded and airborne target detection is assumed to occur only when detection occurs in the main channel and not in the guard channel. In each of FIGS. 5a and 5b, numerals 55 and 56 respectively designate $P_D$ of ML and SL targets. As seen from these two figures, both systems are equally effective as far as suppressing SL targets. The $P_D$ of SL targets drops to zero as the SNR reaches a value designated as $S_1$. However, whereas in the present invention, the $P_D$ for ML targets increases with increased SNR, in the prior art system the $P_D$ for ML targets start to decrease as the SNR exceeds a given value, designated $S_2$. Thus, strong ML targets are suppressed. This point can be appreciated by referring again to FIG. 1. Assuming a very strong airborne target, such as T1 at close range, the probability is quite high that the output $a_G$ of the guard channel would be higher than the guard channel threshold level. Thus, detection in the guard channel would occur which in the prior art system would inhibit the detection of the airborne target.

The present invention also differs from the prior art system described in the aforementioned article. Therein, no thresholding of the guard channel takes place. Thus, detection in the guard channel always occurs even when no radar returns are received, due to the ever present noise in the guard channel. FIG. 5c is a diagram similar to FIGS. 5a and 5b for such a system. As seen therefrom, in such a prior art system, the $P_D$ for ML targets increases with SNR, as is the case in the present invention. However, the disadvantage of such a prior art system is that the probability of detecting SL targets extends over a larger SNR range. Thus, more SL targets are detected, which represent false airborne targets, than is the case with the present invention. Alternately stated, the $P_D$ is substantially reduced as compared with the system of the present invention.

The reason for such performance may be explained as follows. The upper limit of K, or the ratio threshold (represented by F in the article), is clearly the ratio of the mainlobe gain, $G_{ML}$ to the guard antenna gain $G_G$. For explanatory purposes, let the upper limit be assumed to be 30. The lower limit of K is the ratio of $G_{SL}$ to $G_G$, which is assumed to be ½. Thus, K must lie between 30 and ½. In the prior art system, since no guard channel thresholding is employed in order to detect weak ML targets, K must be quite small, closer to the lower limit which causes the system to detect more SL targets. The reason why K has to be close to the lower limit in the prior art system may best be explained in connection with several examples. Let it be assumed that K = 15, that the noise level in both channels is 1 unit, and that the main channel threshold is 4. Let it further be assumed that a strong ML target is detected so that $a_m \approx 90$ units. Therefore, $a_G \approx 3$, since 90/3 = 30 is greater than K = 15, and $a_M = 90$ is greater than $T_M = 4$, the strong target will be detected. However, let us assume a weak ML target so that $a_M = 6$. Consequently, the radar returns received by the guard antenna is 6/30 = 0.2. However, since it is below the noise level of 1 in the guard channel, the ratio of $a_M/a_G$ is not 6/0.2 = 30, but rather 6/1 = 6. Since this ratio is less than K = 15, this weak target will not be detected. In order to detect weak ML targets in the prior art system, K is made close to its lower limit. However, this causes more SL targets to be detected which is undesirable.

This limitation is overcome by the present invention in which the guard channel output $a_G$ is thresholded by unit 42 (see FIG. 3) which provides a true output $V_G$ only when $a_G$ exceeds the guard threshold $T_G$. This enables the value of K to be set further away from its lower limit. Consequently, both strong and weak ML targets are detected with a high degree of probability, while at the same time most SL targets are suppressed.

It was discovered that these goals are achieved by selecting K to be at or near its midrange point, i.e., at or near a mid-value between its upper and lower limits. $T_G$ is chosen to be somewhat greater than the actual background noise level in the guard channel, e.g., 1.5 times the noise level, while $T_M$ is chosen to be 3 times the background noise level in the main channel. Thus, in the preferred embodiment of the invention, while K is fixed, $T_M$ and $T_G$ vary as the noise level varies. The backgound noise level in each channel is obtained in a manner well known in the art, such as by means of a CFAR circuit known as a constant false alarm rate. Two such CFAR circuits are shown in FIG. 6. CFAR circuit 61 is assumed to be connected to main channel processor 28. Its output which represents the background noise level in the main channel is multiplied by a multiplier 62 whose output is $T_M$. Similarly, CFAR 63 is assumed to be connected to the guard channel processor 33 to provide an output representing the guard channel background noise level. This output is multiplied by multiplier 64 to provide the guard channel threshold $T_G$. As previously pointed out, it is preferable to have higher detection sensitivity, i.e., lower threshold in the guard channel than in the main channel.

Thus, the multiplication factor of multiplier 64 is lower than that of multiplier 62. However, to insure that detection in the guard channel is not based on the noise, the multiplication factor of multiplier 64 should be greater than 1.

Attention is now directed to FIG. 7 which is a simple diagram of one embodiment of the discrimination unit 45 which provides a true output D in accordance with the logic equation $D = V_M\overline{V_G} + V_M V_G V_R$. Unit 45 is shown including an AND gate 66 which provides a true output only when $V_M$, $V_G$ and $V_R$ are true. Unit 45 also includes an inverter 67 and an AND gate 68 which provides a true output only when $V_M$ is true and $V_G$ is false. Gates 66 and 68 are connected to an OR fate 69 whose output, designated D, is true only when the output of either of the two AND gates is true.

There has been shown and described herein a novel target detection system in a radar system employing main and guard channel antennas. It should be appreciated that although the invention was described in connection with specific examples, those familiar with the art may make modifications therein without departing from the spirit of the invention. For example, in the examples used herebefore, it was assumed that the guard antenna 13 is offset (toward ground) by an angle $\theta$ with respect to the main antenna 12. Such offset is not a prerequisite for the present invention and can be eliminated. Also, if desired, the guard antenna may or may not scan together with the main antenna. Furthermore, the guard antenna gain need not be greater than the main antenna gain if the guard channel sensitivity is greater than the main channel sensitivity. Also, the relative gains of the two antennas need not be as large as herebefore described. Therefore, all modifications and equivalents introduced in the described embodiments are deemed to fall within the scope of the invention as claimed in the appended claims.

What is claimed is:

1. In a radar system of the type including first and second antennas for receiving radar returns from targets including an airborne target to be detected and main and guard channels for providing respectively a main channel output in response to the radar returns received by said first antenna and a guard channel output in response to the radar returns received by said second antenna, an arrangement comprising:

first means responsive to the main channel output and the guard channel output for providing a selected output only when effectively the ratio of the main channel output to the guard channel output exceeds a selected ratio threshold level; and second means responsive to said first means and to the outputs of said main and guard channels for providing a target indication signal either when said main channel output exceeds a selected main channel threshold level and the guard channel output is less than a selected guard channel threshold level or when the output of said main and guard channels respectively exceed said main and guard channel threshold levels and said first means provides said selected output.

2. The system as described in claim 1 wherein said guard channel threshold level is smaller than said main channel threshold level.

3. The system as described in claim 1 wherein said first antenna is a high gain narrow beamwidth antenna, and said second antenna is a low gain wide beamwidth antenna.

4. The system as described in claim 3 further including third means for generating said selected guard channel threshold level as a function of the background noise level in said guard channel, with said guard channel threshold level being greater than said background noise level in said guard channel.

5. The system as described in claim 4 further including fourth means for generating said selected main channel threshold level as a function of the background noise level in said main channel, with said main channel threshold level being greater than said background noise level in said main channel.

6. The system as described in claim 5 wherein said guard channel threshold level is smaller than said main channel threshold level.

7. The system as described in claim 1 wherein said first means include means for amplifying said guard channel output by a factor definable as K and comparing means for providing said selected output only when the unamplified main channel output exceeds the amplified guard channel output, or wherein said first means include means for attenuating said main channel output by said K factor and comparing means for providing said selected output only when the attenuated main channel output exceeds the unattenuated guard channel output.

8. The system as described in claim 7 wherein said first antenna is a high gain narrow beamwidth antenna, and said second antenna is a low gain wide beamwidth antenna.

9. The system as described in claim 8 further including third means for generating said selected guard channel threshold level as a function of the background noise level in said guard channel, with said guard channel threshold level being greater than said background noise level in said guard channel.

10. The system as described in claim 9 further including fourth means for generating said selected main channel threshold level as a function of the background noise level in said main channel, with said main channel threshold level being greater than said background noise level in said main channel.

11. The system as described in claim 10 wherein said guard channel threshold level is smaller than said main channel threshold level.

12. In an airborne radar system of the type including a main high gain narrow beamwidth antenna for transmitting radar signals reflected back as radar returns to said main antenna from an airborne target and from ground targets and a guard low gain wide beamwidth antenna for receiving radar returns from said targets, said system further including a receiver with a main channel for providing an output for radar returns received by said main antenna and a guard channel for providing an output for radar returns received by said guard antenna, an arrangement comprising:

first means responsive to the main channel output for providing a true output only when said main channel output exceeds a selected main channel threshold level;

second means responsive to the guard channel output for providing a true output only when said guard channel output exceeds a selected guard channel threshold level and for providing a false output when said guard channel output does not exceed said guard channel threshold level;

third means responsive to the outputs of said main and guard channels for corresponding range-doppler cells for providing a true output only when effectively the ratio of the outputs of said channels exceeds a selected ratio threshold level; and fourth means responsive to the outputs of said first, second and third means for providing an airborne-target-indicating signal only when either the output of said first means is true and the second means output is false or when all the outputs of said first, second and third means are true.

13. The system as described in claim 12 wherein the guard channel threshold level is less than the main channel threshold level.

14. The system as described in claim 12 wherein said main antenna pattern is characterized by a mainlobe with a gain definable as $G_{ML}$, and sidelobes including a sidelobe with a gain definable as $G_{SL}$ and said guard antenna pattern is characterized by a primary lobe with a gain definable as $G_G$ and said selected ratio threshold level is less than $G_{ML}/G_G$ and greater than $G_{SL}/G_G$.

15. The system as described in claim 12 further including fifth means for generating said guard threshold level as a function of the background noise level in said guard channel, with the guard threshold level being greater than said background noise level in said guard channel, and sixth means for generating said main threshold level as a function of the background noise level in said main channel with the main threshold level being greater than said background level in said main channel.

16. The system as described in claim 15 wherein said fifth means include a multiplier for multiplying the background noise level in said guard channel by a factor X and said sixth means include a multiplier for multiplying the background noise level in said main channel by a factor Y where $Y > X$.

* * * * *